Jan. 5, 1926.
W. K. HUFF
1,568,844
PINTO BEAN HARVESTING MACHINE
Filed May 14, 1923     2 Sheets-Sheet 1
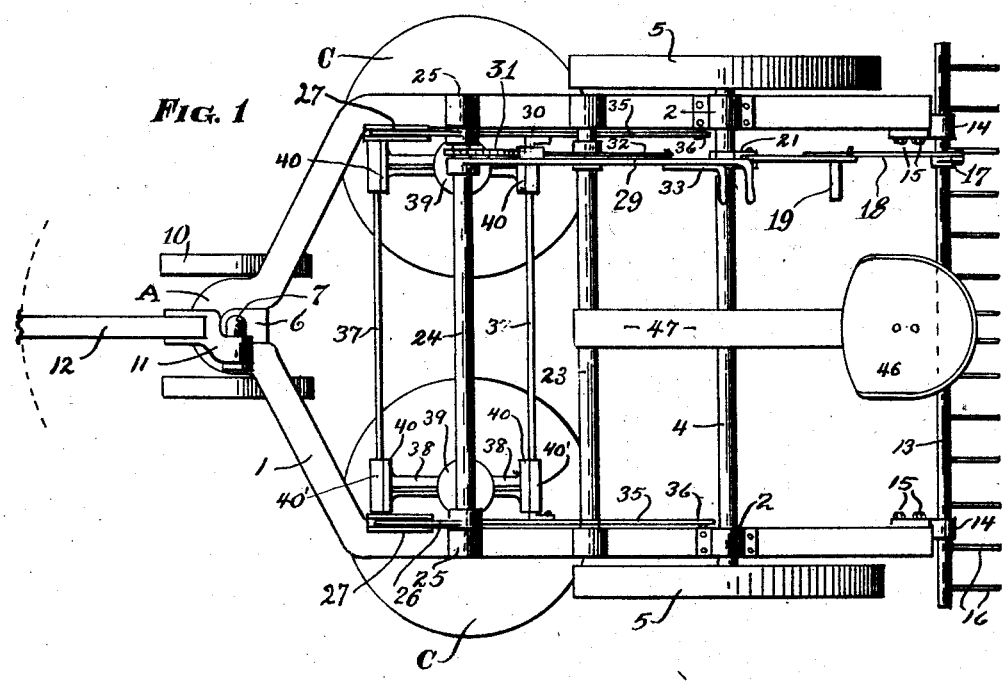
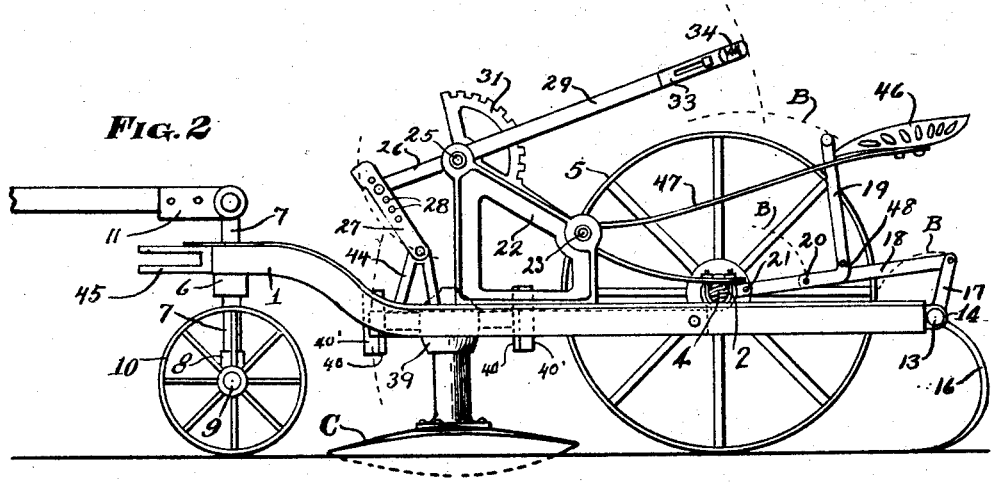
INVENTOR.
Wellman K. Huff
BY
U. G. Charles    ATTORNEY

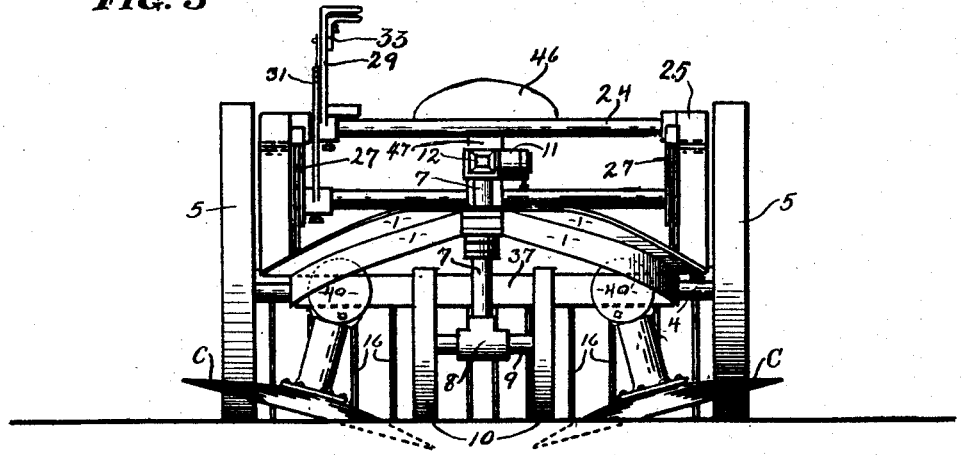

Patented Jan. 5, 1926.

1,568,844

UNITED STATES PATENT OFFICE.

WELLMAN K. HUFF, OF GUY, NEW MEXICO.

PINTO-BEAN-HARVESTING MACHINE.

Application filed May 14, 1923. Serial No. 638,887.

*To all whom it may concern:*

Be it known that I, WELLMAN K. HUFF, a citizen of the United States, residing at Guy, in the county of Union and State of New Mexico, have invented certain new and useful Improvements in Pinto-Bean-Harvesting Machines, reference being had to the accompanying drawings, which form a part of this application.

My invention relates to that class of harvesting machines adapted to gather the plant, eliminating undue agitation which preserves the production.

The objects of my invention are as follows:

First, to produce a compact machine that will turn in a small space.

Second, to simplify and construct a machine, eliminating superfluous operating parts.

Third, to provide a machine with cutting discs, horizontally disposed, and being adjustably mounted.

Fourth, to produce a machine that will sever the plant from its roots, and collect the plants by raking them into windrows, economizing the loss which ordinarily occurs by the beans dropping from their hull by undue agitation.

Referring to the drawings, Fig. 1 is a top view of the machine. Fig. 2 is a side view with one large wheel removed for convenience of illustration. Fig. 3 is a front end view, Fig. 4 is a detail perspective view of the spindle clamps. Fig. 5 is a detail of the shackle.

1 is a frame, preferably formed from a steel angle and on said frame are mounted boxings 2, by which means the axle 4 is rigidly attached, and on the ends of said axle are rotatably mounted wheels 5, which are carrying means for the rear part of frame 1. The said frame 1 is bent in U shape as shown at A, and in said curvature is clamped a block 6, through which is pivotally mounted a shaft 7, said shaft having a boxing 8 attached to the lower end thereof, and thru said boxing is journaled a shaft 9 and on the ends of said shaft are mounted wheels 10, which are the carrying means for the front of said frame 1.

The top end of shaft 7 is bent at a right angle engaging through a member 11, and pivotally supports said member, and the opposite end of said member is channeled to receive a tongue 12, which is rigidly attached therein, and by which means the machine is guided. On the rear end of said frame 1 is journalled a shaft 13 in a boxing 14, said boxing being rigidly attached to said frame 1, by means of bolts 15. On said shaft 13 are firmly attached a plurality of rake fingers 16, which are adapted to engage along the surface of the ground to collect the beans for the purpose hereinafter described.

On said shaft 13 is rigidly attached an arm 17, and pivotally mounted to said arm a bar 18 and on the opposite end of bar is pivotally connected a lever 19 as at 20, said lever being attached to a yoke 21, said yoke being firmly clamped to an axle 4. When lever 19 is thrown forward the toggle joint is disengaged and one end of said toggle joint being attached to arm 17, is means for rotating said arm as shown by dotted lines B, thereby discharging the load collected by the rake fingers.

On frame 1 are mounted brackets 22, said brackets being connected to a shaft 23. 24 is a shaft rotatably mounted being journalled to said brackets at 25. On said shaft 24 are mounted arms 26, said arms connecting shackles 27, said shackles having holes 28 for convenience of adjustment. 29 is a hand lever adapted to rotate shaft 24 and to be stationed by a pawl 30 engaging with a notched sector 31, said pawl operated by a connecting rod 32, and said rod being connected to a sliding grip 33, which is tensioned by a spring 34. The said sector 31 has its bearings on shaft 24 and rod 23 as means for holding said sector in a fixed position.

On the inside of frame 1, is pivotally mounted frame 35 at 36, said frame having cross bars 37, and on said bars are mounted T arms 38, which are integral with the disk housings 39, in which revolves a journal to which disks are attached, having adjusting heads 40 composed of two sections and referred to as 40 and 40'.

That portion of the head 40 which is attached to arm 38, has notches 41 on opposite sides of the diametrical axis thereof and said notches adjusted to engage over a protruding bar 42 which is integral with that portion of the head 40'. In said heads 40 and 40' is interposed an elongated segmental hole 43 through which pass bolts as means to bind the said head members together at a desired angle for the pitch of the disks, and the desired connection between said disks is simultaneously binding on bars 37.

Brackets 44 are rigidly attached to frame 35 by which means said frame is raised and lowered by action of lever 29, said lever and brackets 44 being pivotally connected by a shackle 27 as heretofore described. 45 is a yoke in which is placed a double tree (not shown) to which a team may be hitched as conveying and operating means, a seat 46 is provided for the driver mounted on a spring 47, said spring being attached to axle 4, and extending around shaft 23. By operating lever 29, upward or downward the disk C is adjusted to the desired depth to cut the bean plant below the ground and as the machine travels forward the rake 16 will gather the plants and when a sufficient load is gathered the operator will press lever 19 forward discharging the plants in windrows as heretofore described when lever 19 is drawn back to its normal position having a pin 48 which engages on the top of bar 18. The said lever is held in alignment with the right angle bend of lever 19, which holds the rake 16 rigid in position for collecting the plants.

The construction of the vertical shaft and housing for the said discs is covered in my former Patent No. 1,298,046. I therefore do not attempt to claim such construction in this application, but I do mean to use the same and claim specifically the horizontal cutting position of the disc, or such degree of variation to the compulsory cutting position, to sever the plant from its roots beneath the surface of the ground.

Such modifications may be made as lie within the scope of the appended claims. What I claim as new, and desire to secure by Letters Patent is;

1. In a machine of the class described the combination with a wheel supported frame, of a frame pivotally mounted therein, means for adjusting said frame angularly upwardly and downwardly about its pivot and relative to the wheel supported frame, opposed heads formed in sections and movable with the frame, means for holding one of the sections of each head against rotation relative to the frame, cooperating interfitting means upon the sections of each head for holding them against relative rotation, one of said sections being adjustable about the common axis of the heads when said interfitting means are disengaged, means for holding together the sections of each head subsequent to their relative adjustment, a housing depending from and movable with the adjustable section of each head, and a rotatable cutting disk supported by each housing.

2. In a harvester a wheel supported main frame, a frame mounted to swing relative thereto, means for adjusting the swinging frame angularly, cross bars carried by the swinging frame, heads disposed in sections slidably engaging the respective bars, one of said sections being grooved to receive a bar, a housing depending from and movable with the other section of each head, a rotatable disk carried by the lower end portion of each housing, interfitting means upon the sections of each head for holding the rotatable section against movement relative to the grooved section, and means extending through the sections for clamping them together and upon the interposed bar, thereby to hold the depending housing at a predetermined angle relative to the swinging frame.

3. In a harvester a wheel supported main frame, a frame mounted to swing relative thereto, means for adjusting the swinging frame angularly, cross bars carried by the adjustable frame, depending housings, rotatable disks at the lower ends thereof, and means for mounting said housings for angular adjustment in a plane extending transversely of the swinging frame and for adjustment transversely of the swinging frame, the axis of rotation of the swinging frame being parallel with the paths of sliding adjustment of the housings.

WELLMAN K. HUFF.